Feb. 4, 1958 J. C. COLLIER ET AL 2,821,809
METAL EDGING
Filed May 25, 1956
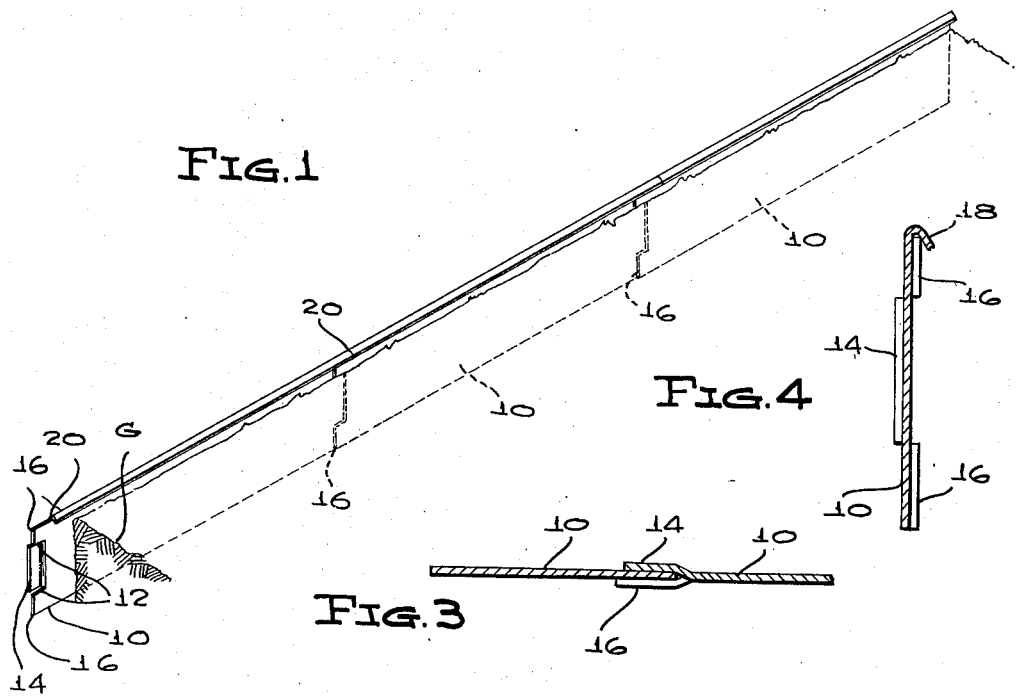
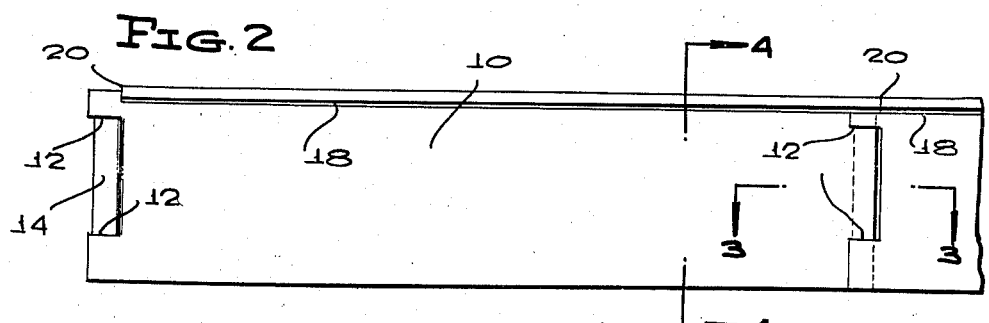
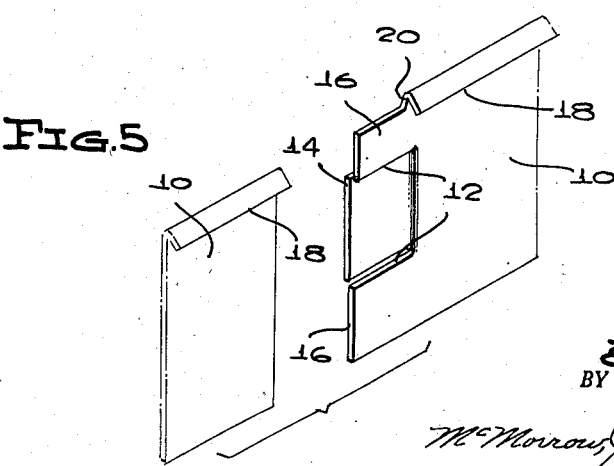
INVENTORS
JAMES C. COLLIER
& MARSHALL H. LAYNE
BY
McMorrow, Berman & Davidson
ATTORNEYS

United States Patent Office 2,821,809
Patented Feb. 4, 1958

2,821,809

METAL EDGING

James C. Collier and Marshal H. Layne, Dallas, Tex.

Application May 25, 1956, Serial No. 587,289

1 Claim. (Cl. 47—33)

The present invention relates generally to edging means of the type used for positioning about flower beds, trees, or shrubs, and along driveways, fences, and walkways, as grass barriers, flower bed borders, etc. More particularly, the invention has reference to metal edging comprising a plurality of identically formed strips, having a novel joint connection facilitating the assembly of said strips to provide an edging of a selected length.

Summarized briefly, the edging comprises a plurality of strips each having at one end transversely spaced, longitudinally extending slits, with the material of the edging member between the slits being offset laterally, to receive the adjacent end of a like edging member. Formed upon the top edges of the strips are downwardly turned flanges, providing a rolled upper edge on the edging assembly, with each flange being cut away at the end of the member having the laterally offset tongue, to permit a flush or butt joint between the adjacent ends of the flanges of adjacent strips.

The main object of the present invention is to provide a generally improved edging means of the type referred to. Among more specific objects of the invention are the following:

To provide a novel and improved joint between adjacent strips, characterized by the ease with which the strips can be connected and by the low cost and ease with which the strips can be manufactured;

To so form the edging as to permit the entire assembly to be provided at a relatively low cost, with each component element of the assembly being identical to all other components thereof and each component, further, being readily cut and formed out of a single piece of flat metal material;

To provide edging as described which, when embedded in the ground, will be held securely in place;

To so design the edging as to cause the joints thereof to be either completely concealed or at least quite inconspicuous when the edging is in use;

To insure that the edging will not have sharp edges that may cause injury to children and others; and To provide edging which not only can be assembled with particular ease and speed, but further, will be capable of disassembly for use at another location with corresponding facility.

Other objects will appear from the following description, the claim appended thereto, and from the annexed drawing, in which like reference characters designate like parts throughout the several views, and wherein:

Figure 1 is a perspective view of a metal edging assembly formed in accordance with the present invention, as it appears when in use;

Figure 2 is an enlarged elevational view of said assembly, a portion being broken away;

Figure 3 is a detail sectional view taken longitudinally through the assembly at one of the joints, the scale being enlarged still further on line 3—3 of Figure 2;

Figure 4 is a transverse sectional view on line 4—4 of Figure 2, on the same scale as Figure 3; and Figure 5 is a fragmentary, exploded perspective view showing the adjacent portions of the edging strips, that are to be interengaged through the use of a joint formed according to the present invention.

Referring to the drawings in detail, the metal edging constituting the present invention includes a plurality of end-abutting, rectangular, elongated strips 10 formed identically to one another and adapted to be embedded for a substantial part of their widths in the ground G. The strips are preferably formed of a heavy gauge, hot dip galvanized metal material, to resist corrosion and to provide a highly durable assembly that can nevertheless be manufactured at relatively low cost by mass production manufacturing methods.

Each strip 10, at one end thereof, is formed with longitudinally extending slits 12 spaced inwardly from the opposite longitudinal edges of the strip, said slits 12 extending inwardly from the extremity of the strip a suitable distance, which may be substantially short as compared to the overall length of the strip. Defined between the slits 12 is a tongue 14, extending longitudinally of the strip and terminating at the slit extremity of the strip. The tongue 14 is offset laterally, for its full length, that is, the full length of the slits 12 which define said tongue. In this connection, the tongue 14 would be offset laterally to such an extent as to define a space between said tongue and the portions 16, 16 of the strip immediately above and below the tongue, equal to the thickness of the strip.

The upper longitudinal edge of each strip 10 is formed with a downwardly rolled flange 18, to eliminate sharp edges that might be hazardous to children and others. The flange 18, at the slit end of the strip, is cut away to define at this end of the strip a recess 20, and said recess is of a length equal to the length of the slits 12, with the recess being coextensive with the slits as best shown in Figure 2.

The flange or lip 18 extends continuously for the remainder of the length of the strip, so that the other end of the flange, shown on the left hand strip portion viewed in Figure 5, is flush with the opposite extremity of the body portion of the strip.

The purpose of cutting away flange 18 at the slit end of the strip is to permit a flush or butt joint to be made between adjacent flanges 18 when a pair of adjacent strips 10 are interengaged in the manner shown in Figures 1, 2, and 3.

In use of the edging, a selected number of the strips 10 is employed, according to the overall length of the edging assembly desired. To assemble the edging, the unslit end of one strip is inserted between the tongue 14 and portions 16 of the next adjacent strip, and is pressed into the space between said tongue 14 and portions 16 for the full depth of the slits 12 as shown in Figure 3. This securely interengages the strips with the flanges 18, in end-abutting relation.

It is important to note, as shown in Figure 3, that when the tongue 14 is offset laterally from the portions 16 a space equal to the thickness of the strip 10 to be accommodated therebetween, the portions 16 are slightly offset laterally out of the plane of the body portion of the strip in an opposite direction. As a result, the space between the tongue 14 and portion 16 is in the plane of the body of the strip. Therefore, when the left hand strip shown in Figure 3 is engaged in the space between the tongue and said portions, it lies in the plane of the body of the right hand strip shown in this figure of the drawing. This causes the flanges 18 to be longitudinally aligned, and further insures that the assembled edging strips will all lie in a common vertical plane when the assembly is completed.

In use, the strips can be assembled within a narrow trough, with the dirt being filled in at opposite sides of the strip, although the particular manner in which the strips will be assembled and embedded in the ground will, of course, be at the option of the user. The strips will project above the ground a relatively short distance as shown in Figure 1, in a preferred installation, thus to provide a neat edging, with only the flanges or rolled upper edge portion of the assembly projecting above the level of the ground.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A metal edging comprising a plurality of like strips separably connected in end-to-end relation, each strip being formed at one end with transversely spaced, longitudinal slits defining therebetween a tongue, said tongue being laterally offset in one direction from the main plane of the strip, the slits defining portions above and below said tongue laterally offset in an opposite direction from said main plane, thereby to define a space between said tongue and said portions receiving the end of an adjacent strip with the connected strips lying in a common plane, each strip including along one longitudinal edge a downwardly bent lip, the lip of each strip extending fully to the unslit end of the strip, the other end of the lip terminating short of the slit extremity of the strip at a distance away from said extremity equal to the length of the slits, said lip lying in a plane at an acute angle to said main plane of the strip and terminating at its lower edge at a level below that of the top edge of the laterally offset portion disposed above the tongue, the lip being disposed at the same side of the main plane of the strip as the side to which said portions are laterally offset from the main plane, the lip of each strip hooking over the top edge of the upper laterally offset portion of a next adjacent strip.

References Cited in the file of this patent

UNITED STATES PATENTS

| | | |
|---|---|---|
| 1,843,108 | Clayden | Feb. 2, 1932 |
| 1,945,784 | Myer | Feb. 6, 1934 |